US009184693B2

(12) United States Patent
Yun et al.

(10) Patent No.: US 9,184,693 B2
(45) Date of Patent: Nov. 10, 2015

(54) SUPPORTING DEVICE FOR SOLAR PANEL

(71) Applicant: LSIS CO., LTD., Anyang-si, Gyeonggi-do (KR)

(72) Inventors: Deok Yong Yun, Gwangju (KR); Yong Nam Cho, Cheonan-si (KR)

(73) Assignee: LSIS Co., Ltd., Anyang-Si, Gyeonggi-Do (KR)

( * ) Notice: Subject to any disclaimer, the term of this patent is extended or adjusted under 35 U.S.C. 154(b) by 151 days.

(21) Appl. No.: 14/145,103

(22) Filed: Dec. 31, 2013

(65) Prior Publication Data
US 2015/0162866 A1 Jun. 11, 2015

(30) Foreign Application Priority Data

Dec. 10, 2013 (KR) ........................ 10-2013-0153433

(51) Int. Cl.
*B63B 35/44* (2006.01)
*H01L 31/042* (2014.01)

(52) U.S. Cl.
CPC ................. *H02S 20/00* (2013.01); *B63B 35/44* (2013.01); *B63B 2035/4453* (2013.01)

(58) Field of Classification Search
USPC ........................................................ 114/263
IPC .... B63B 35/34,35/38, 35/44, 2035/4453; H02S 20/00
See application file for complete search history.

(56) References Cited

U.S. PATENT DOCUMENTS

| 5,529,012 | A | * | 6/1996 | Rytand | ......................... | 114/263 |
| 5,951,785 | A | * | 9/1999 | Uchihashi et al. | ............ | 136/251 |
| 2013/0146127 | A1 | | 6/2013 | Lunoe et al. | | |
| 2014/0224165 | A1 | * | 8/2014 | Veloso et al. | ................. | 114/267 |

FOREIGN PATENT DOCUMENTS

| DE | 10-2009-019548 | 11/2010 |
| EP | 2549551 | 1/2013 |
| JP | 47-45037 | 12/1972 |
| JP | 48-75431 | 12/1973 |
| JP | 06-040011 | 5/1994 |
| JP | 08-253910 | 10/1996 |
| JP | 2002-173083 | 6/2002 |
| JP | 2004-063497 | 2/2004 |

(Continued)

OTHER PUBLICATIONS

European Patent Office Application Serial No. 14150654.3, Search Report dated Apr. 16, 2015, 7 pages.

(Continued)

*Primary Examiner* — Stephen Avila
(74) *Attorney, Agent, or Firm* — Lee, Hong, Degerman, Kang & Waimey

(57) ABSTRACT

The present disclosure relates to a photovoltaic system and, more particularly, to a supporting device for a solar panel employed in a photovoltaic system. A supporting device for a solar panel includes a buoyant member including an upper body in which a plurality of protrusions are formed upwardly and first and second props are formed on the protrusions to prop a solar panel, respectively, and a lower body in which a wing part is formed to be protruded from the side thereof and a lower surface is formed to be protruded downwardly, and a connector formed to have a box shape and connecting the buoyant members in a vertical direction or horizontal direction, wherein the buoyant members are coupled to the connector as the wing parts are coupled to the connector.

19 Claims, 21 Drawing Sheets

(56) References Cited

FOREIGN PATENT DOCUMENTS

| | | |
|---|---|---|
| JP | 2004-071965 | 3/2004 |
| JP | 2007-109769 | 4/2007 |
| JP | 2014-511043 | 5/2014 |
| WO | 2011/094803 | 8/2011 |
| WO | 2012/139998 | 10/2012 |
| WO | 2012/139998 A2 | 10/2012 |
| WO | 2012/139998 A3 | 10/2012 |

OTHER PUBLICATIONS

Japan Patent Office Application Serial No. 2014-003031, Office Action dated Dec. 24, 2014, 9 pages.
Korean Intellectual Property Office Application Serial No. 10-2013-0153433, Office Action dated Jan. 27, 2015, 6 pages.
Intellectual Property Office of Singapore Application Serial No. 2014000590, Office Action dated Jun. 8, 2015, 14 pages.
Japan Patent Office Application Serial No. 2014-003031, Office Action dated Jun. 2, 2015, 3 pages.

* cited by examiner

Fig. 2
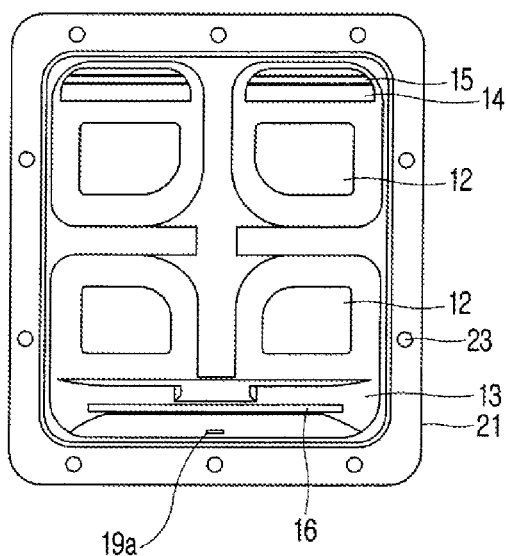
(a)
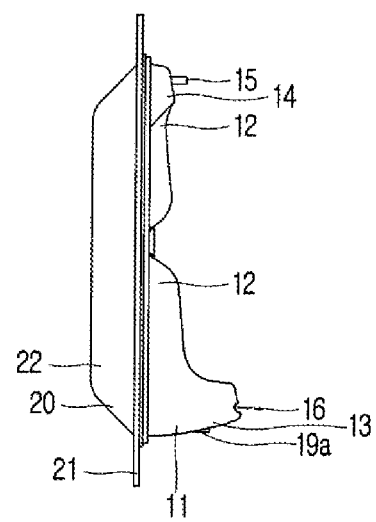
(b)
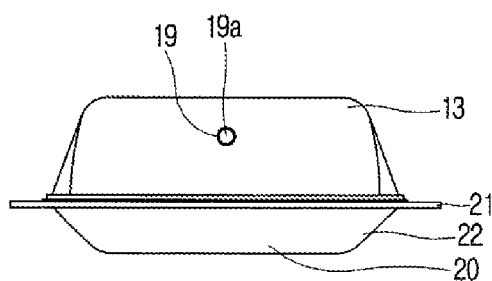
(c)

Fig. 5
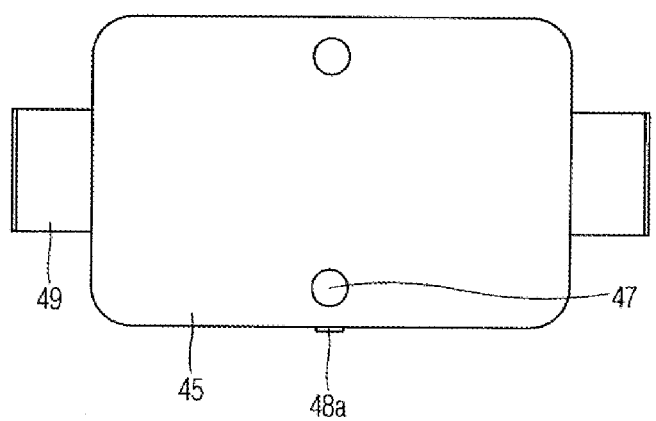
(a)
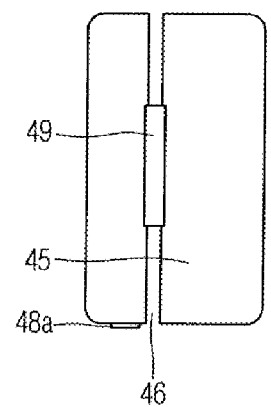
(b)
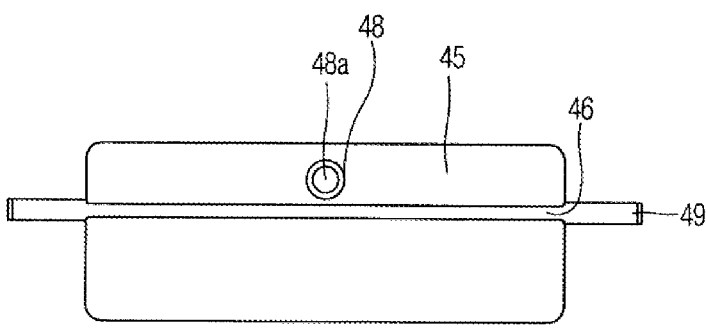
(c)

SUPPORTING DEVICE FOR SOLAR PANEL

CROSS-REFERENCE TO RELATED APPLICATION

Pursuant to 35 U.S.C. §119(a), this application claims the benefit of earlier filing date and right of priority to Korean Application No. 10-2013-0153433, filed on Dec. 10, 2013, the contents of which is incorporated by reference herein in its entirety.

BACKGROUND OF THE INVENTION

1. Field of the Invention

The present disclosure relates to a photovoltaic system and, more particularly, to a supporting device for a solar panel employed in a photovoltaic system.

2. Background of the Invention

In general, a photovoltaic system (or a solar photovoltaic power generation system) is a system that generates power by converting photovoltaic energy into electric energy using a solar cell.

Power generation efficiency of a photovoltaic system greatly relies on a quantity of radiation of solar light, and an influence of a temperature needs to be considered. In order to enhance power generation efficiency of a photovoltaic system, a large quantity of radiation of solar light is provided, a large site is required, and a rather cold area is advantageous. Thus, in most cases, small-scale photovoltaic systems are installed in land due to difficulty in selecting a site, or the like, so recently, photovoltaic systems are installed on the water to enhance efficiency. In many cases, photovoltaic systems are installed on the roof in land and installed on the water having a low water level and a low wave height.

A solar module essential in a photovoltaic system generally include solar cells and supplies electricity through a connector band and an inverter. Here, a solar cell module is fixedly installed in a structure formed of steel, iron, aluminum profile, or the like, and may be classified as a fixed type solar module, a single axis type solar module, a biaxial solar module, and the like, according to a structure scheme.

In order to support a solar module, a support structure is required, and for water adaptation, a support structure using a buoyant member to utilize characteristics of a water environment has been developed. For example, WO2012/139998 entitled 'Panel Supporting Device' may be referred.

In this invention, a plastic case 2 composed of a bottom wall 3, an upper wall 4, and side walls 5, 6, 7, and 8, has a space including air therein so as to float on the water upon receiving buoyancy, and a unit is provided in the upper wall 4 to support the solar module.

Also, a connection member 30 is provided to connect a plurality of plastic cases 2 horizontally and vertically. The connection member 30 serves as a connection passage allowing an operator to step on and pass by for maintenance or management.

However, in this invention, elastic fixing members 61, 62, 63, and 64 for installing the solar module in the plastic case 2 are slide type members, causing difficulty in maintenance. The reason is because, when the operator steps on the connection member 30, it is sagged between the modules.

In addition, an airtight space is formed between a lower portion of the plastic case 2 and a water surface, allowing floating matters to be accumulated therein.

SUMMARY OF THE INVENTION

Therefore, an aspect of the detailed description is to provide a supporting device for a solar panel capable of preventing inter-module sagging and preventing floating matters from being accumulated therein.

To achieve these and other advantages and in accordance with the purpose of this specification, as embodied and broadly described herein, a supporting device for a solar panel including: a buoyant member including an upper body in which a plurality of protrusions are formed upwardly and first and second props are formed on the protrusions to prop a solar panel, respectively, and a lower body in which a wing part is formed to be protruded from the side thereof and a lower surface is formed to be protruded downwardly; and a connector formed to have a box shape and connecting the buoyant members in a vertical direction or horizontal direction, wherein the buoyant members are coupled to the connector as the wing parts are coupled to the connector.

A receiving part may be formed in the second prop to allow the solar panel to be installed therein.

The receiving part may be formed as a rail.

Coupling recesses may be formed on one sides of the first and second props, and the solar panel may be fixedly coupled by clamps and bolts inserted into the coupling recesses.

Also, an air hole may be formed in a portion of the first prop.

A uni-directional valve may be provided in the air hole.

A plurality of first screw holes may be formed in the wing part.

The lower surface may have a streamlined shape.

The upper body and the lower body may be integrally formed.

A groove may be formed on the lateral circumference of the connector, and the wing part may be inserted into the groove.

The supporting device may further include: a second connector interposed between the connectors.

A second groove may be formed in a lateral surface of the second connector in a length direction and communicate with the groove, and a second wing part may be formed in a lateral surface thereof in a width direction and coupled to the groove of the connector in the width direction.

The supporting device may further include a support pipe coupled to the wing part in order to fixedly connect a plurality of buoyant members.

To achieve these and other advantages and in accordance with the purpose of this specification, as embodied and broadly described herein, a supporting device for a solar panel, including: a buoyant member including an upper body in which a plurality of protrusions are formed upwardly to support a solar panel and an upper wing part is formed in a lateral surface thereof and a lower body in which a lower wing part is formed to be protruded from the side thereof and a lower surface thereof is protruded downwardly; and a connector having a box shape, having connection wing parts protruded from the sides thereof, and connecting the buoyant members in vertical and horizontal directions, wherein the upper wing part and the lower wing part are coupled to form main wing parts, and the buoyant members are coupled to the connector by coupling the connection wing parts to the main wing parts.

First and second props may be formed on the protrusions to support the solar panel.

Clamp mounting parts may be formed in the first and second props to couple a clamp to fix the solar panel.

A support portion may be formed to be protruded upwardly from a central portion of the lower body.

An upper ventilation hole may be formed in a central portion of the upper body, and a lower ventilation hole may be formed to communicate with the upper ventilation hole.

A plurality of upper creases may be formed on the edges of the upper wing part, and lower creases may be formed on the edges of the lower wing part to correspond to the upper creases.

When the upper wing part and the lower wing part come into contact to be coupled, a gap may be formed between the upper creases and the lower creases.

An end portion of the upper wing part may be formed to be bent in a "ㄱ" shape along the edges.

A plurality of slip preventing protrusions may be arranged to be formed on upper surfaces of the buoyant member and the connector vertically and horizontally, and a plurality of slip preventing recesses may be arranged to be formed on lower surfaces thereof vertically and horizontally.

A plurality of ribs may be formed on the lateral surface of the connector in order to reinforce rigidity.

The connector may include a first connector and a second connector shorter than the first connector.

In the second upper wing part of the second connector, a step is formed such that a width directional portion thereof is lower than a length directional portion thereof.

A groove may be formed in a lateral surface of the second connector in the width direction.

Inner spaces of the buoyant member and the connector may be filled with Styrofoam or earth and sand, stone, or steel.

A loading recess may be formed in the first prop, and a loading protrusion may be formed in the second prop.

With the supporting device for a solar panel according to exemplary embodiments of the present invention, since a solar panel is stably fixed to buoyant members by clamps and bolts, the solar panel may not move.

Also, since each module is fixedly bound to a connector and a second connector, modules may be stably maintained, without sagging. Thus, an operator may easily step on the connector to perform a maintenance operation.

In addition, since floating matters are not accumulated within the supporting device, the supporting device may be maintained clean, reducing the necessity of management.

Further scope of applicability of the present application will become more apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from the detailed description.

BRIEF DESCRIPTION OF THE DRAWINGS

The accompanying drawings, which are included to provide a further understanding of the invention and are incorporated in and constitute a part of this specification, illustrate exemplary embodiments and together with the description serve to explain the principles of the invention.

In the drawings:

FIG. 2(a) is a plan view of a buoyant member, FIG. 2(b) is a side view of the buoyant member, and FIG. 2(c) is a rear view of the buoyant member in the supporting device for a solar panel according to an exemplary embodiment of the present disclosure.

FIG. 5(a) is a plane view of a second connector of the supporting device for a solar panel, FIG. 5(b) is a side view of the second connector, and FIG. 5(c) is a front view of the second connector according to an exemplary embodiment of the present disclosure.

DETAILED DESCRIPTION OF THE INVENTION

Figure 1:
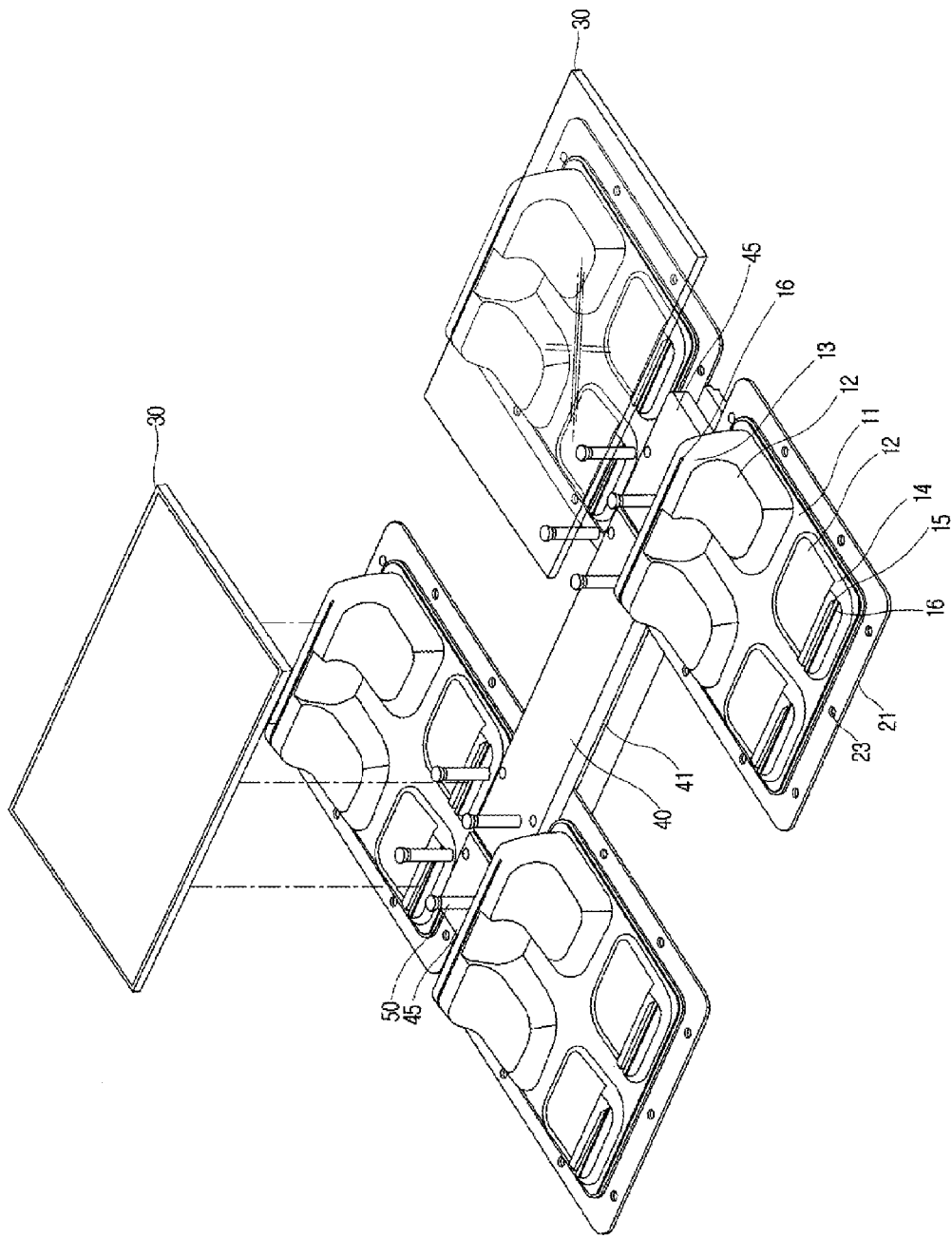
FIG. 1 is a perspective view of a supporting device for a solar panel according to an exemplary embodiment of the present disclosure.

Description will now be given in detail of the exemplary embodiments, with reference to the accompanying drawings. For the sake of brief description with reference to the drawings, the same or equivalent components will be provided with the same reference numbers, and description thereof will not be repeated.

In the present disclosure, when components are paired, general terms of the components and specific separate terms thereof may be discriminately used. For example, creases 119 and 129 generally refer to an upper crease 119 and a lower crease 129.

A supporting device for a solar panel according to an exemplary embodiment of the present disclosure includes a buoyant member 10 including an upper body 11 in which a plurality of protrusions 12 are formed upwardly and first and second props 13 and 14 propping a solar panel 30 are formed on the protrusions 12, and a lower body 20 in which a wing part 21 is formed to be protruded from the side thereof and a lower surface 22 is formed to be protruded downwardly; and a connector 40 formed to have a box shape and connecting the buoyant members 10 in a vertical direction or horizontal direction.

Here, the buoyant members 10 are coupled to the connector 40 as the wing parts 21 are coupled to the connector 40.

Figure 3:
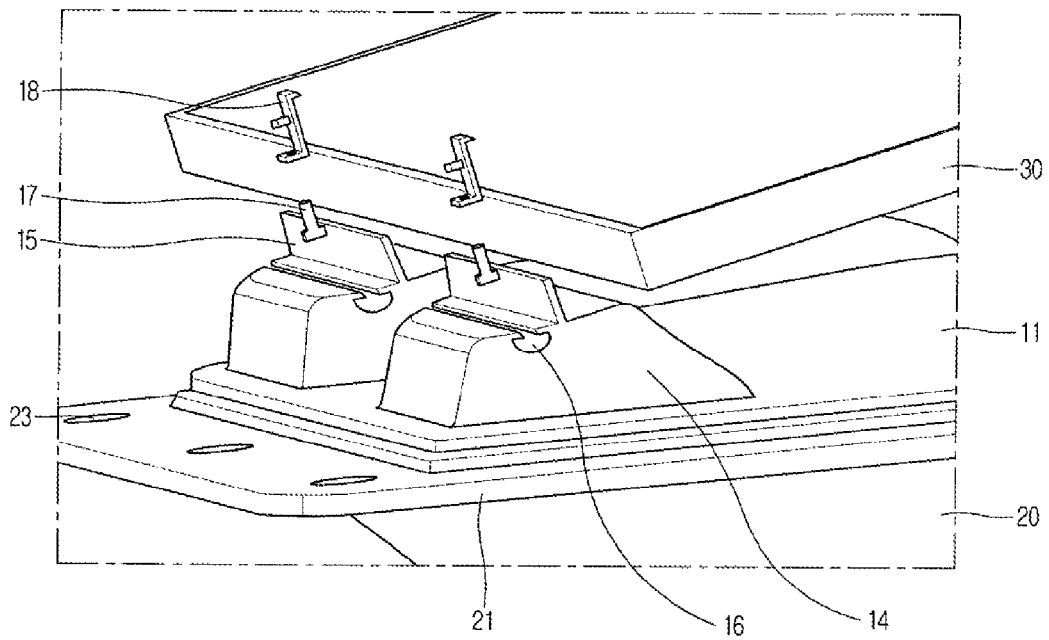
FIG. 3 is a view illustrating combining of the supporting device for a solar panel and a solar panel according to an exemplary embodiment of the present disclosure.
Figure 4:
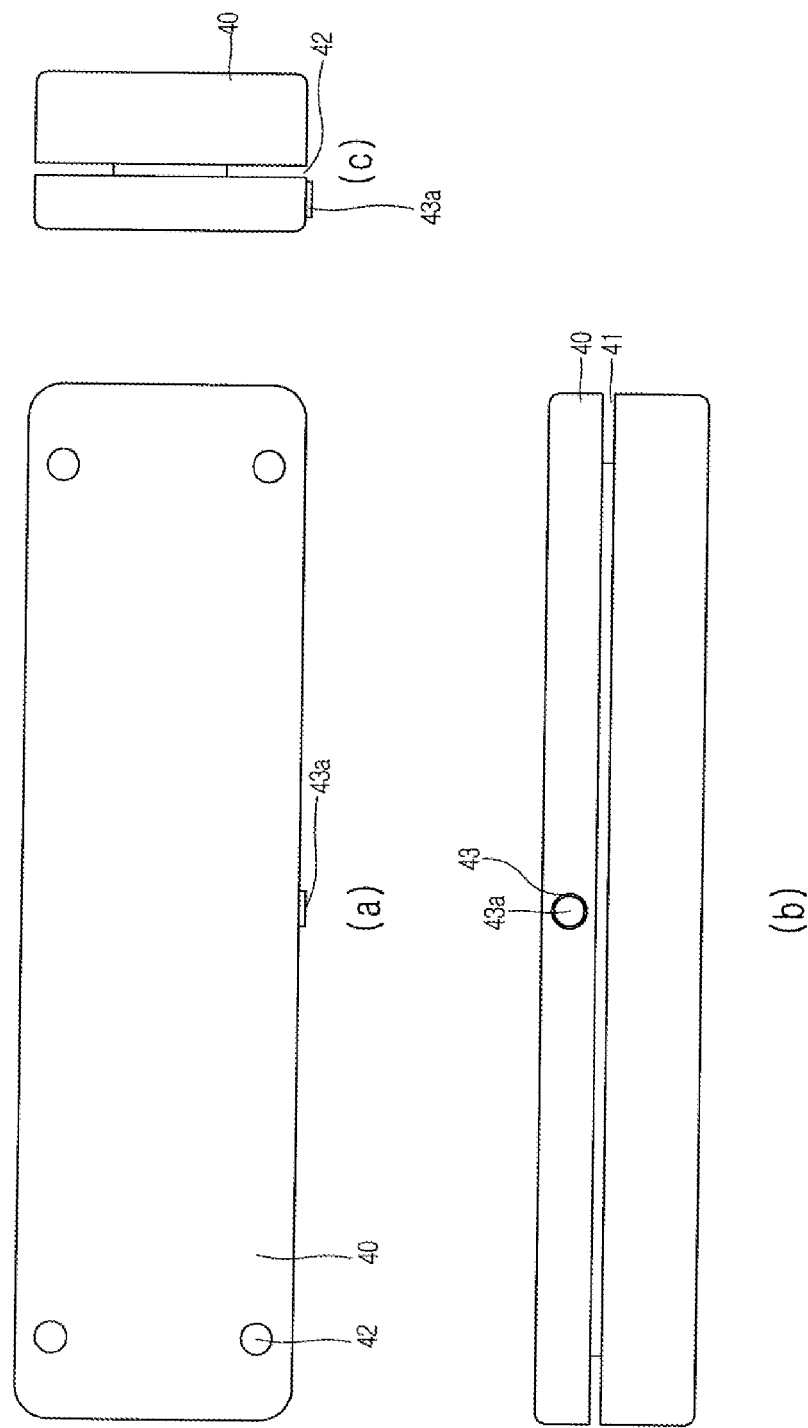
FIG. 4(a) is a plan view of a connector of the supporting device for a solar panel.
FIG. 4(b) is a side view of the connector.
FIG. 4(c) is a front view of the connector according to an exemplary embodiment of the present disclosure.

FIG. 1 is a perspective view of a supporting device for a solar panel according to an exemplary embodiment of the present disclosure. FIG. 2(a) is a plan view of a buoyant member, FIG. 2(b) is a side view of the buoyant member, and FIG. 2(c) is a rear view of the buoyant member in the supporting device for a solar panel according to an exemplary embodiment of the present disclosure. FIG. 3 is a view illustrating combining of the supporting device for a solar panel and a solar panel according to an exemplary embodiment of the present disclosure. FIG. 4(a) is a plan view of a connector of the supporting device for a solar panel, FIG. 4(b) is a side view of the connector, and FIG. 4(c) is a front view of the connector according to an exemplary embodiment of the present disclosure. The supporting device for a solar panel according to an exemplary embodiment of the present disclosure will be described in detail with reference to the accompanying drawings.

The buoyant member 10 is formed as a substantially box type member. The buoyant member 10 may be formed of a synthetic resin to be lightweight, easily receive buoyancy, and have economic feasibility.

The buoyant member 10 may be composed of the upper body 11 and the lower body 20. In the upper body 11, the plurality of protrusions are formed to be convex upwardly. For example, the buoyant member 10 in which each two protrusions are formed horizontally and vertically on the upper body 11 is illustrated. Since a lower surface of each protrusion 12 is opened, air may flow to the interior thereof. Thus, the upper body may receive buoyancy.

The props for propping the solar panel 30 may be formed on the protrusions 12, respectively. The first prop 13 is formed on the protrusions 12 in an upper row, and the second prop 14 may be formed on the protrusions 12 in a lower row. The first prop 13 may be formed to be higher than the second prop 14. Thus, the solar panel 30 may be sloped to effectively receive solar energy. The first prop 13 may be formed on the two protrusions 12. An L-shaped receiving part 15 may be formed on an upper portion of the second prop 14 to be open inwardly to fixedly support the solar panel 30. Thus, when the solar panel 30 is placed in the receiving portion 15 of the second prop 14, it can be easily fixed without being slid downwardly. In addition, a receiving part may be selectively added to an upper portion of the first prop 13 in order to fix the solar panel 30.

Also, since lower surfaces of the first prop 13 and the second prop 14 are open, the interiors thereof are empty. Since the first prop 13 is integrated with the protrusion 12, the interior thereof may form a lower empty space.

Meanwhile, the receiving part 15 of the second prop 14 may be provided as a rail. Since the receiving part 15 of the second prop 14 is formed as a separate component, when the receiving part 15 propping the solar panel 30 is damaged, only the rail may be replaced, facilitating repair.

In order to stably fix the solar panel 30 placed on the respective props, a coupling recess 16 may be formed in an outer side of the first prop 13 and the second prop 14. The solar panel 30 is put on the receiving part 15 of the second prop 14, and coupled by a clamp 18 and a bolt 17 inserted into the coupling recess 16 of the first prop 13 and the coupling recess 16 of the second prop 14.

An air hole 19 is formed on a rear portion of the first prop 13. When air formed within the first prop 13 expands, it may be discharged through the air hole 19. A uni-directional valve 19a may be provided in the air hole 19 in order to allow air within the first prop 13 to flow out and prevent an external foreign material from being introduced into the first prop 13.

The lower body 20 includes the wing part 21 and the lower surface 22 formed to be convex downwardly. The lower body 20 is formed to have open upper surface. The upper body 11 may be integrally coupled to the lower body 20. Thus, an inner space of the upper body 11 and an inner space of the lower body 20 are connected to form a single inner space. Here, the upper body 11 and the lower body 20 may form an exterior surrounding the inner space.

The wing part 21 is formed on four sides of the lower body 20. The wing part 21 may be formed as a flat plate form. A plurality of first screw holes 23 are formed in the wing part 21 and coupled to a connector 40 as described hereinafter.

Preferably, the lower surface 22 of the lower body 20 may have a streamlined shape to encounter less resistance of water.

According to an embodiment, the upper body 11 and the lower body 20 may be integrally formed. In this case, the buoyant member 10 may form an exterior surrounding the inner space.

The connector 40 may have a rectangular box shape. A groove 41 may be formed on the lateral circumference of the connector 40. Also, a second screw hole 42 is formed to penetrate through upper and lower surfaces of the connector 40. The buoyant member 10 is coupled to the connector 40 by inserting the wing part 21 of the buoyant member 10 to the groove 41. The buoyant member 10 is coupled to the connector 40 by a fixing pin 50 penetrating through the second screw hole 42 of the connector 40 and the first screw hole of the wing part 21.

An air hole 43 and a uni-directional valve 43 are provided in one side of the connector 40 to discharge expanded air within the connector 40.

In order to connect the connectors 40, a second connector 45 is provided. The second connector 45 may have a rectangular box shape, like the connector 40. A second groove 46 is formed on a lateral surface of the second connector 45 in a length direction. Also, a third screw hole 47 is formed to penetrate through upper and lower surfaces of the second connector 45. The second groove 46 of the second connector 45 communicates with the groove 41 of the connector 40, and the wing part 21 of the buoyant member 10 is inserted into the second groove 46. The buoyant member 10 is coupled to the second connector 45 by a fixing pin penetrating through the third screw hole 47 of the second connector 45 and the fixing pin 50 penetrating through the first screw hole 23. An air hole 48 and a uni-directional valve 48a are provided in one lateral surface of the second connector 45 to discharge expanded air from the interior of the second connector 45.

A second wing part 49 may be formed to be protruded from the lateral surface of the second connector 45 in a width direction. As the second wing part 49 is inserted into the groove 41 of the connector 40 in the width direction, the connector 40 and the second connector 45 are connected. By connecting the connector 40 and the second connector 45 alternately, connection parts 40 and 45 may be formed to have a desired length, and by coupling a plurality of buoyant members 10 to the connection parts 40 and 45, a supporting device for a solar panel in which the connection parts 40 and 45 and the buoyant members 10 are elongated in a row in a horizontal direction may be manufactured. Also, by sequentially coupling a plurality of rows of supporting devices for a solar panel in a vertical direction, a supporting module for a solar panel may be manufactured.

Figure 6:
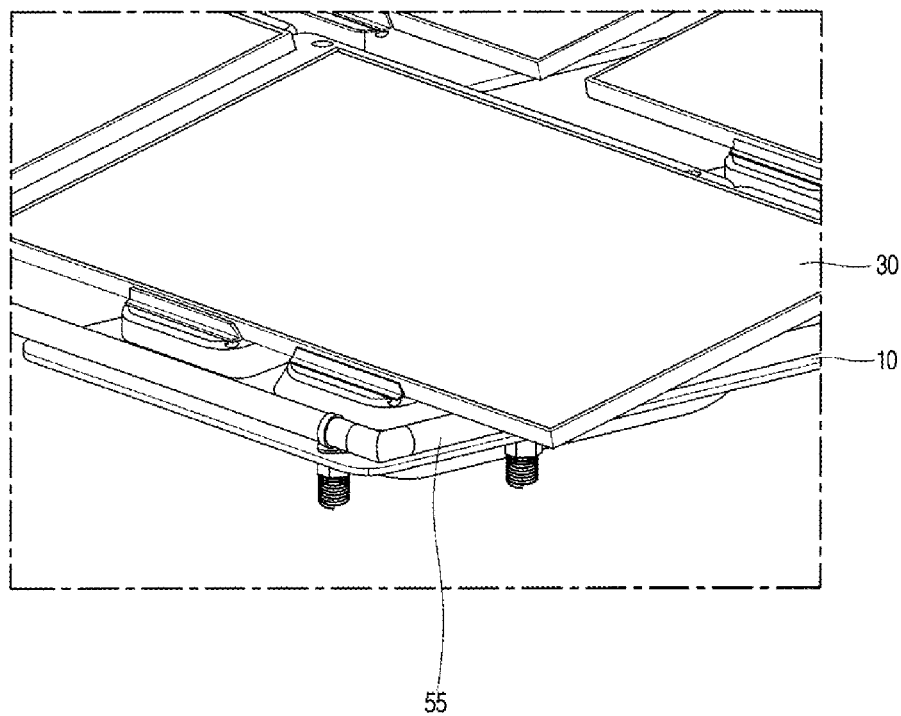
FIG. 6 is a perspective view illustrating a state in which a support tube is applied to the supporting device for a solar panel according to an exemplary embodiment of the present disclosure.
Figure 7:
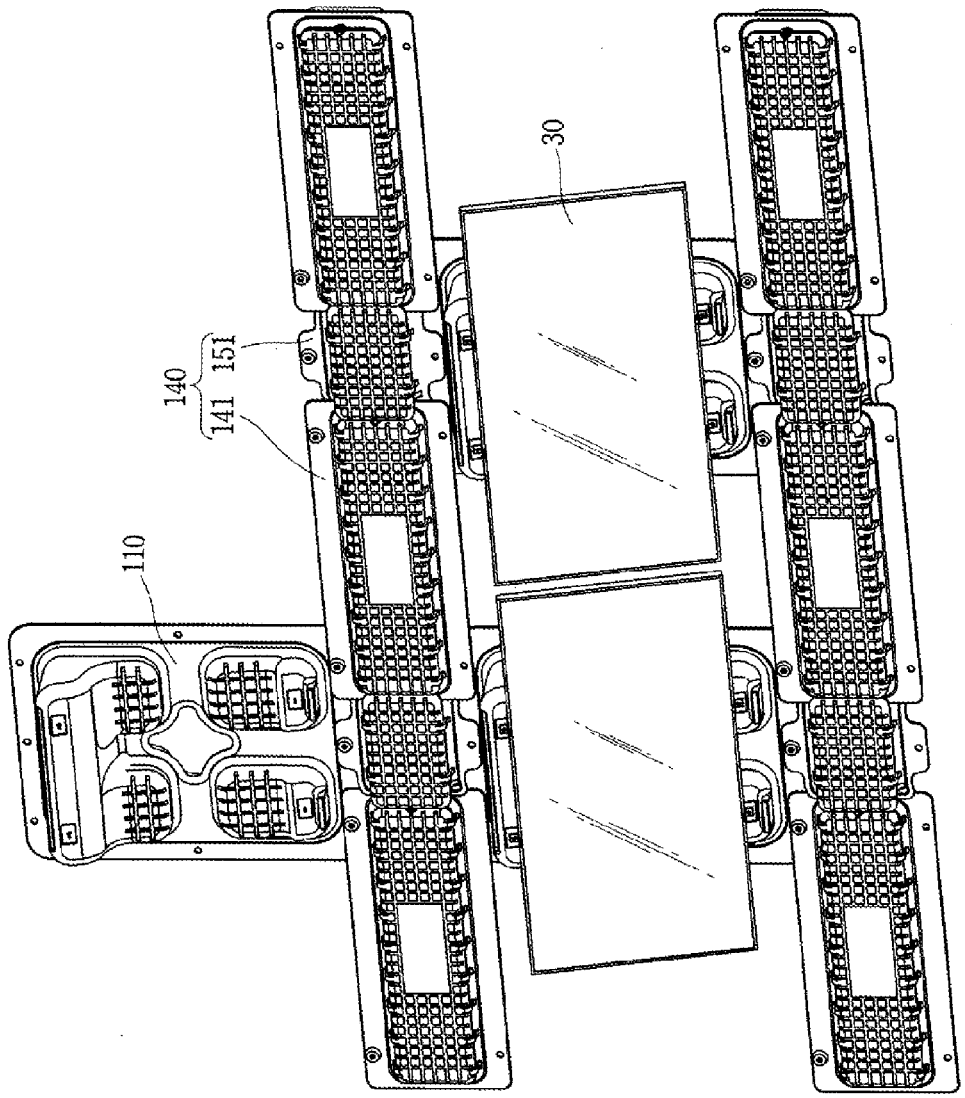
FIG. 7 is a perspective view illustrating a state in which the solar panel is combined to the supporting device for a solar panel according to another exemplary embodiment of the present disclosure.

FIG. 6 illustrates a state in which a support pipe 55 is employed in the foregoing embodiment. In order to more stably support the support module for a solar cell formed vertically and horizontally, the support pipe 55 surrounding the module may be provided. The support pipe 55 may be configured as a steel pipe. The support pipe 55 may be fixed to the first screw hole 23 of the wing part 21 forming the edges of the module. Here, the support pipe 55 may be configured as a circular pipe, an angled pipe, an aluminum profile, a rope, and the like.

Hereinafter, a supporting device for a solar panel according to another exemplary embodiment of the present invention will be described with reference to FIGS. 7 through 17. In the present exemplary embodiment, descriptions of the same components as those of the former exemplary embodiment will be omitted and different components will be described.

The supporting device for a solar panel according to another exemplary embodiment of the present invention includes a buoyant member 110 composed of an upper body 111 having a plurality of protrusions 112 formed in an upper portion thereof to support a solar panel 30 and an upper wing part 111a formed on a lateral surface thereof and a lower body 121 having a lower wing part 122 formed to be protruded from a lateral surface thereof and a lower surface protruded downwardly; and a connector 140 having a box shape, having connection wing parts 143 and 147 formed to be protruded from a lateral surface thereof, and connecting the buoyant member 110 in a vertical direction and horizontal direction. An upper wing part 111a and a lower wing part 122 are coupled to form main wing parts 111a and 122, and as the connection wing parts 143 and 147 are coupled to the main wing parts 111a and 122, the buoyant member 110 is coupled to the connector 140.

The buoyant member 110 includes the upper body 111 and the lower body 121 as in the former exemplary embodiment as described above.

A plurality of protrusion 112 are formed in the upper body 111, and a first prop 113 and a second prop 114 are formed in the protrusions 112.

The upper wing part 111a is formed to be protruded from a lateral surface of the upper body 111. The upper wing part 111a may be formed by elongating a lower surface of the upper body 111. Upper creases 119 are formed in two rows on the edges at an inner side of the upper wing part 111a. Also, an end portion of the upper wing part 111a is formed to be bent in a "ㄱ" shape along the edges.

A plurality of slip preventing protrusions 112a are arranged in a crossing manner vertically and horizontally in the protrusions 112.

Figure 8:
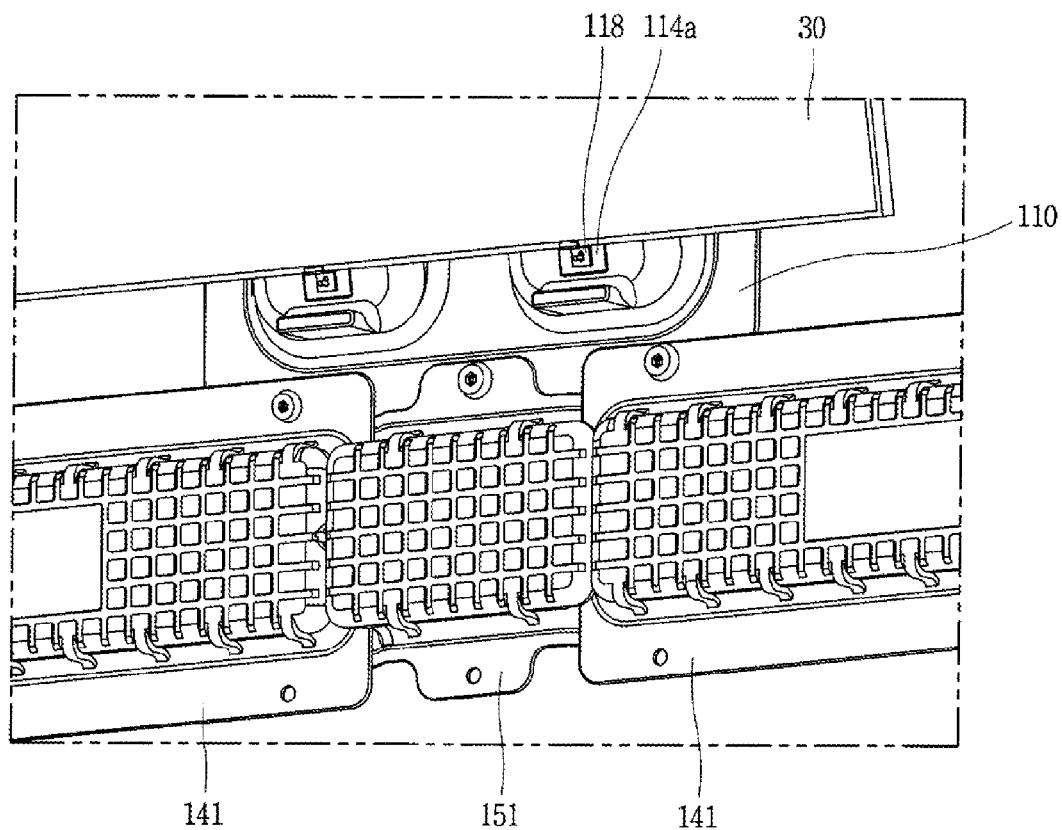
FIG. 8 is a partially detailed view of FIG. 7.
Figure 9:
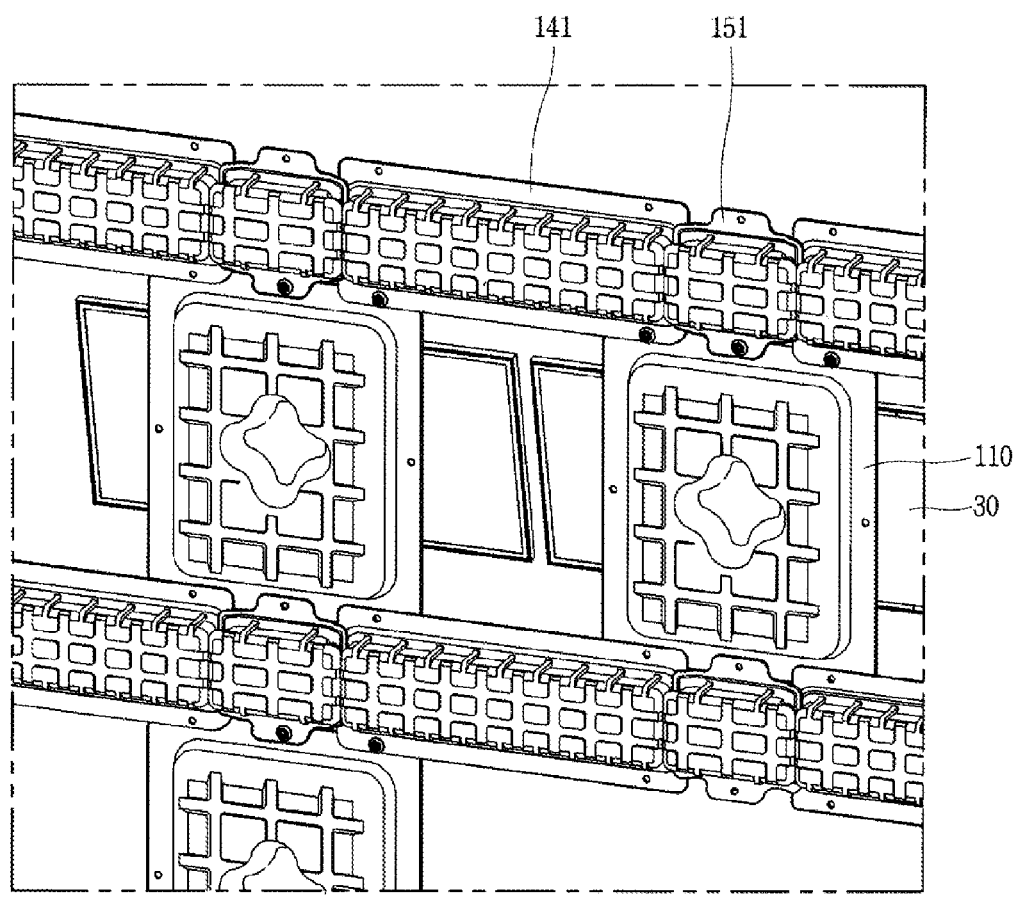
FIG. 9 is a bottom perspective view of FIG. 7.
Figure 10:
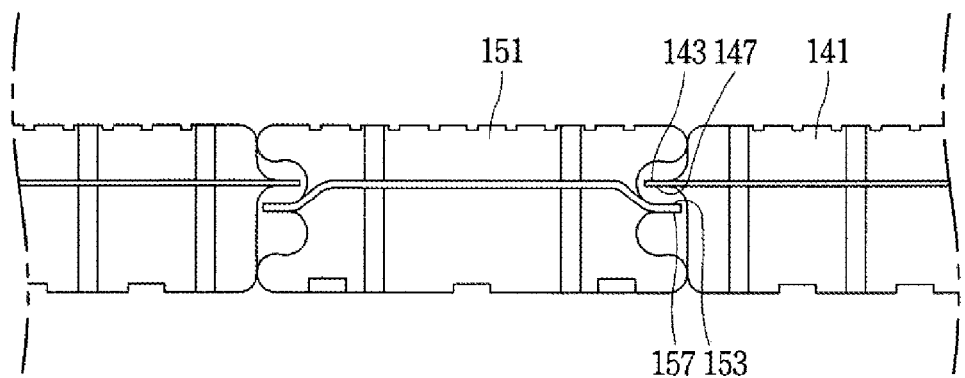
FIG. 10 is a front view of the connector of FIG. 7.
Figure 11:
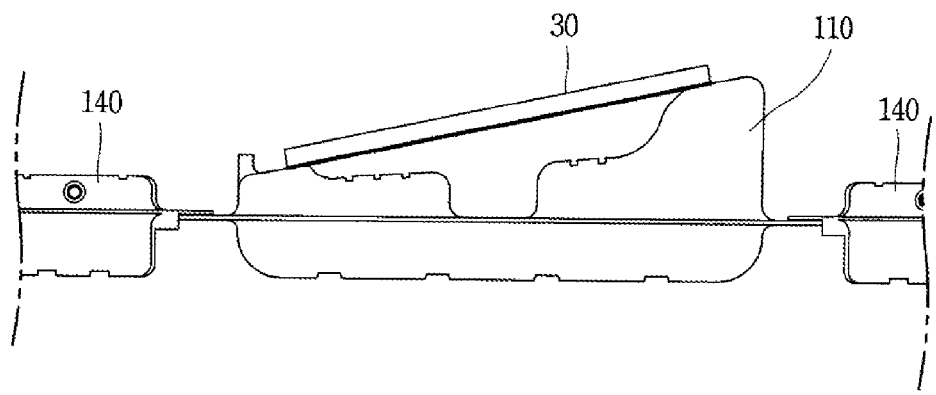
FIG. 11 is a right side view of FIG. 7.
Figure 12A:
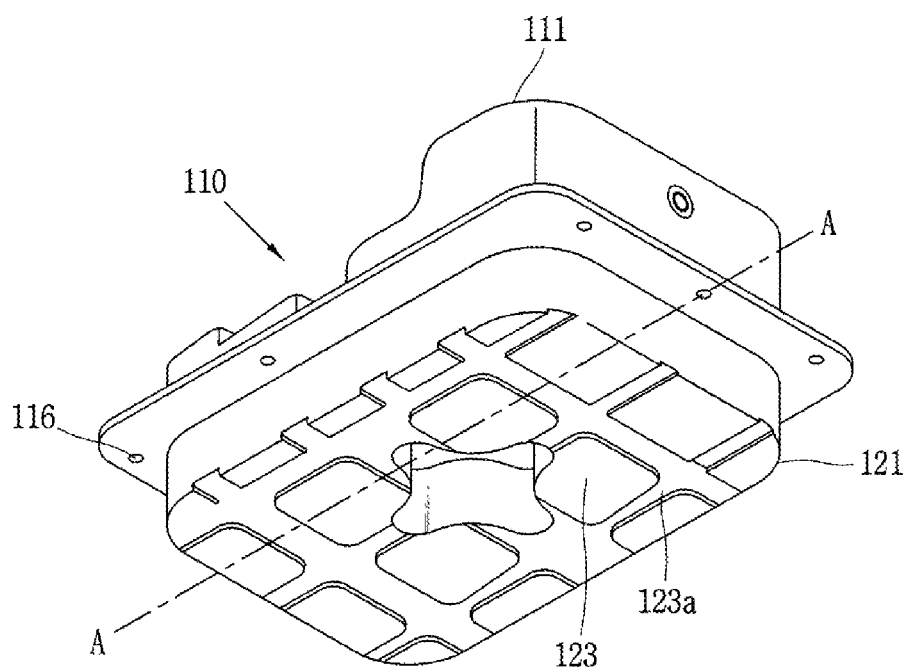
FIG. 12(a) is a bottom perspective view of a buoyant member.
Figure 12B:
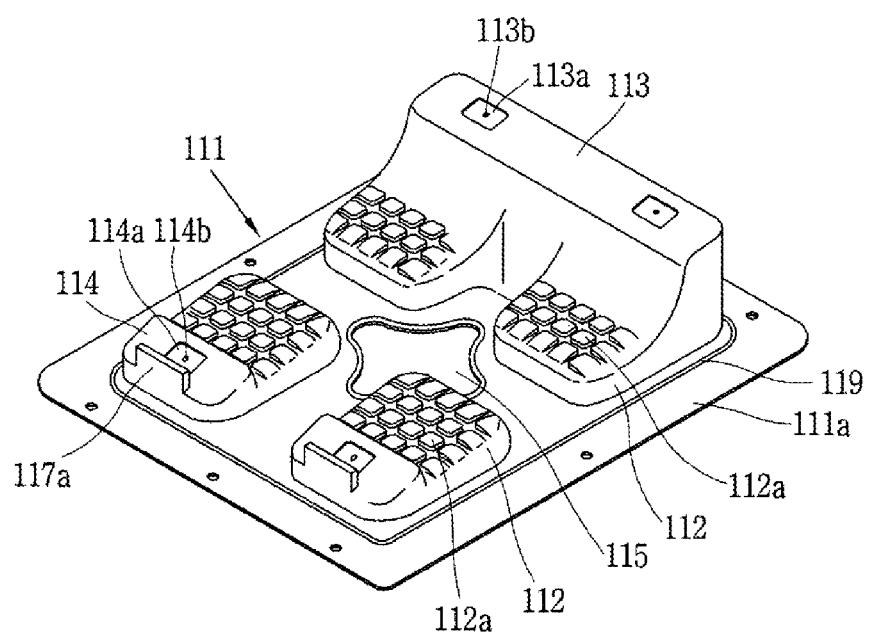
FIG. 12(b) is a perspective view of an upper body.
Figure 12C:
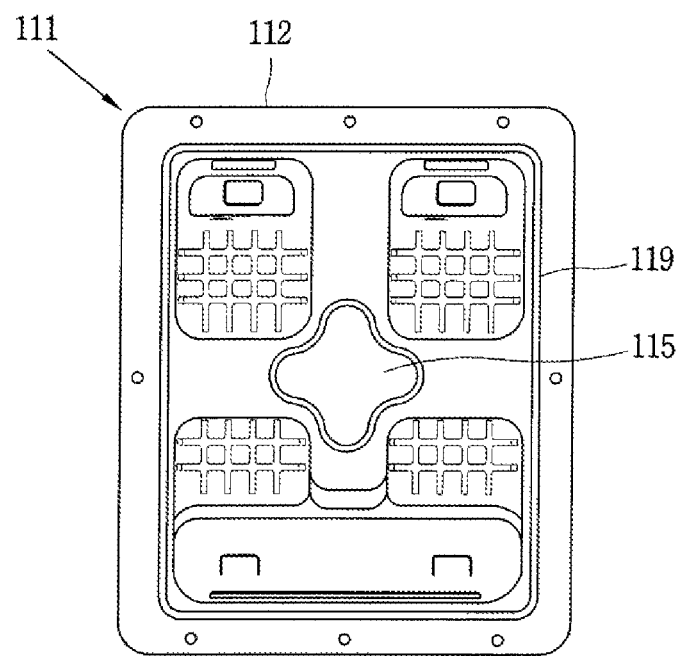
FIG. 12(c) is a bottom view of the upper body.
Figure 12D:
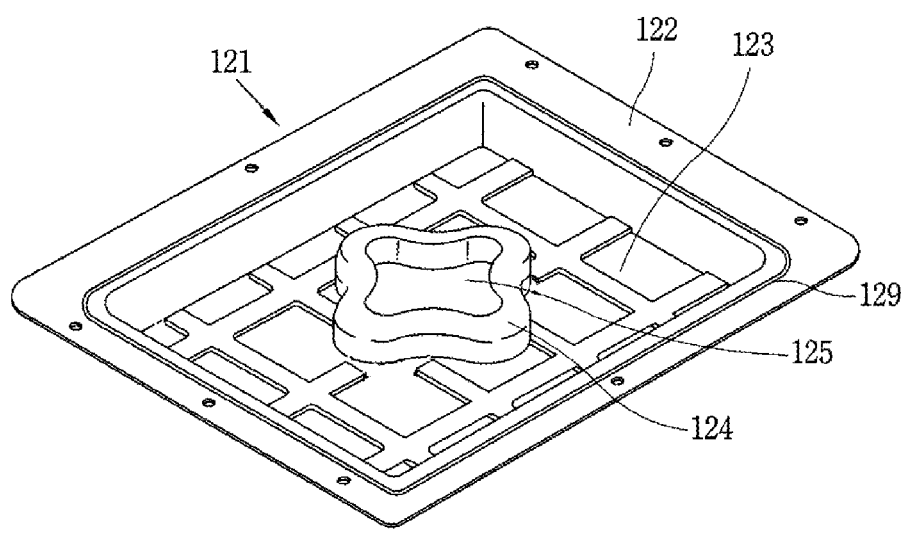
FIG. 12(d) is a perspective view of a lower body.

Clamp mounting parts 113a and 114a may be formed in the first prop 113 and the second prop 114 in order to couple a clamp 118. The clamp mounting parts 113a and 114a may be formed as recesses. Screw holes 113b and 114b may be formed in the clamp mounting parts 113a and 114b. FIG. 8 illustrates a configuration in which the solar panel 30 is fixed to the upper body 111 by the clamp 118.

A upper ventilation hole 115 is formed in a central portion of the upper body 111.

The lower body 121 includes the lower wing part 122 formed to extend from a lateral surface thereof and the lower surface 123 formed to be protruded downwardly. Lower creases corresponding to the upper creases 119 are formed in two rows on the edges of the lower wing part 122.

A support portion 124 is formed to be protruded upwardly from a central portion of the lower surface 123. Preferably, the support portion 124 is formed to be protruded as high as the lower wing part 122. Thus, when the upper body 111 and the lower body 121 are coupled, the support portion 124 may be in contact with a lower surface of the upper body 111, enhancing coupling force and support strength.

A lower ventilation hole 125 communicating with the upper ventilation hole 115 is formed in the support portion 124.

A plurality of slip preventing holes 123a are arranged to cross each other vertically and horizontally in the lower surface 123.

Figure 13:
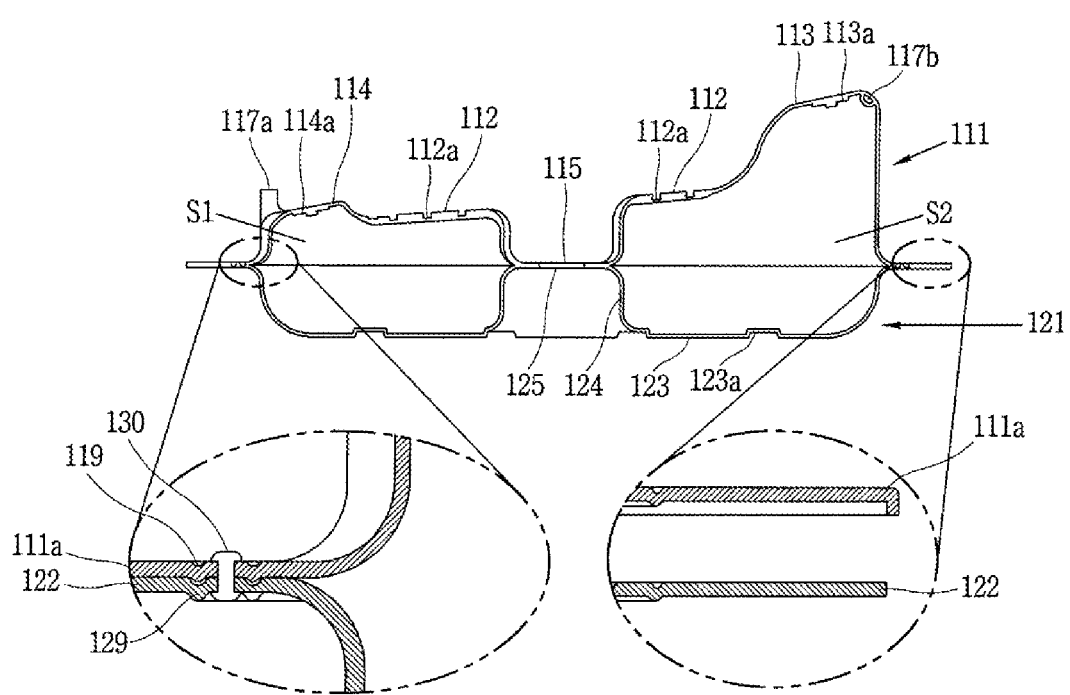
FIG. 13 is a cutaway view of the buoyant member.
Figure 14A:
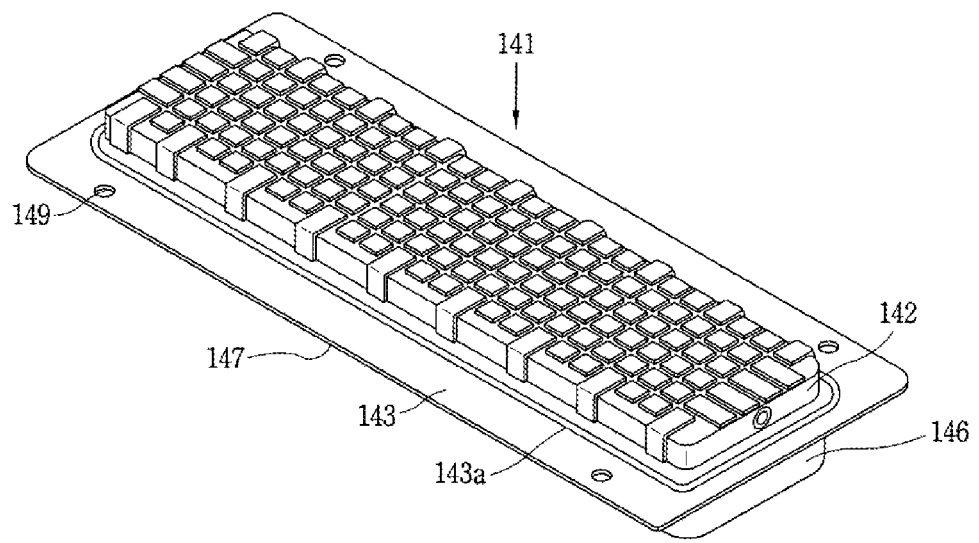
FIG. 14(a) is a perspective view of a first connector.
Figure 14B:
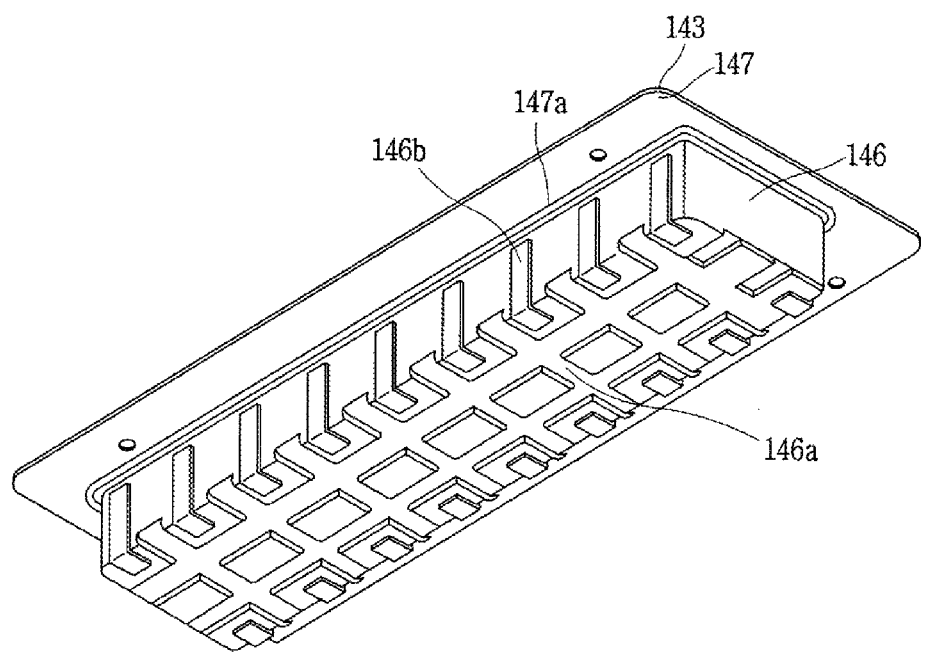
FIG. 14(b) is a bottom perspective view of the first connector.
Figure 14C:
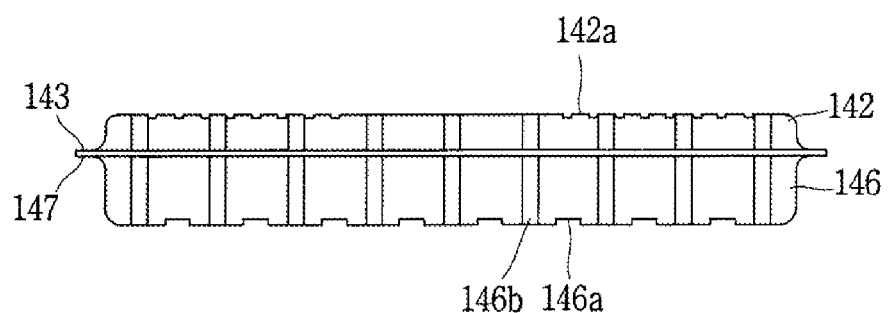
FIG. 14(c) is a vertical side view of the first connector.
Figure 14D:
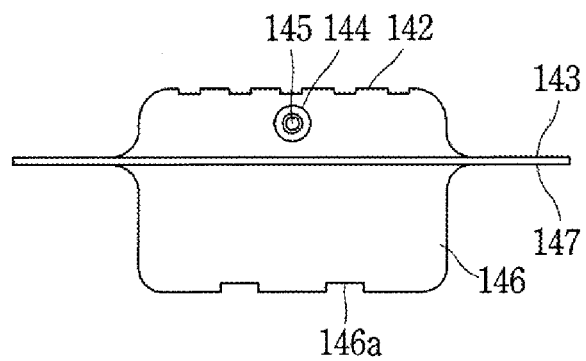
FIG. 14(d) is a horizontal side view of the first connector.
Figure 15A:
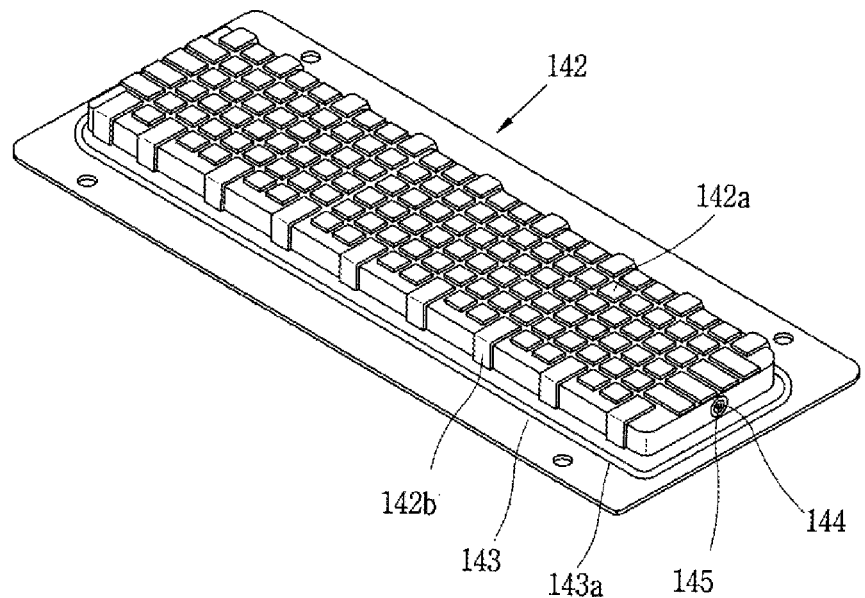
FIG. 15(a) is a perspective view of a first connector upper body and FIG. 15(b) is a perspective view of a first connector lower body.
Figure 15B:
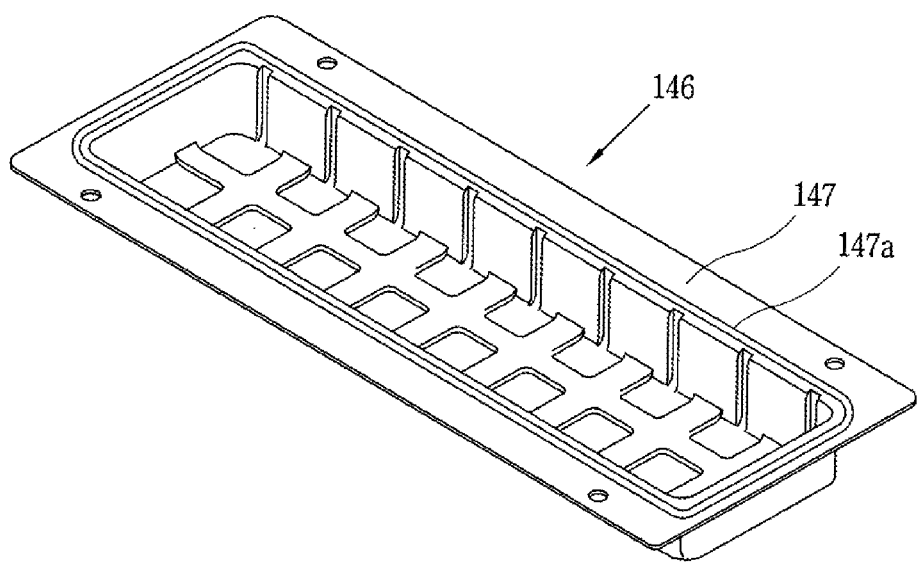
Figure 16:
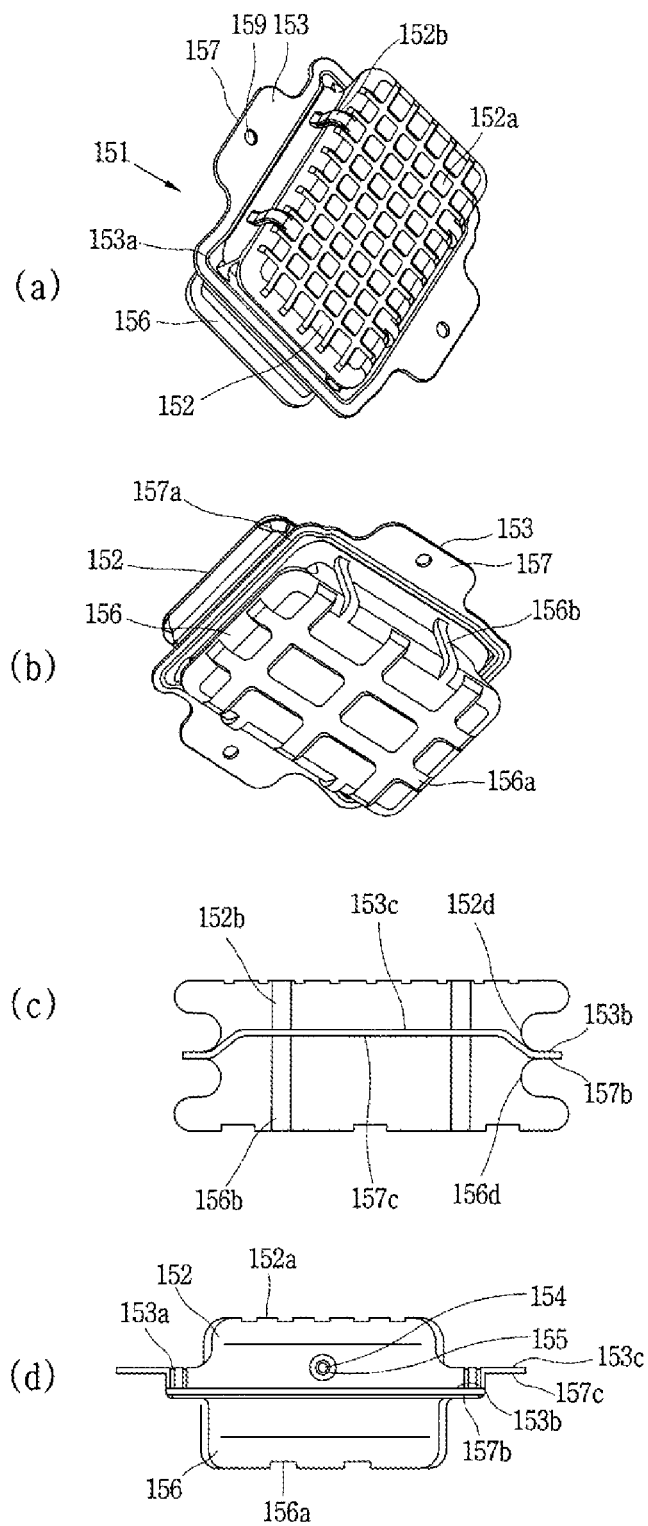
FIG. 16(a) is a perspective view of a second conductor.
FIG. 16(b) is a bottom perspective view of the second connector.
FIG. 16(c) is a vertical side view of the second connector.
FIG. 16(d) is a horizontal side view of the second connector.
Figure 17A:
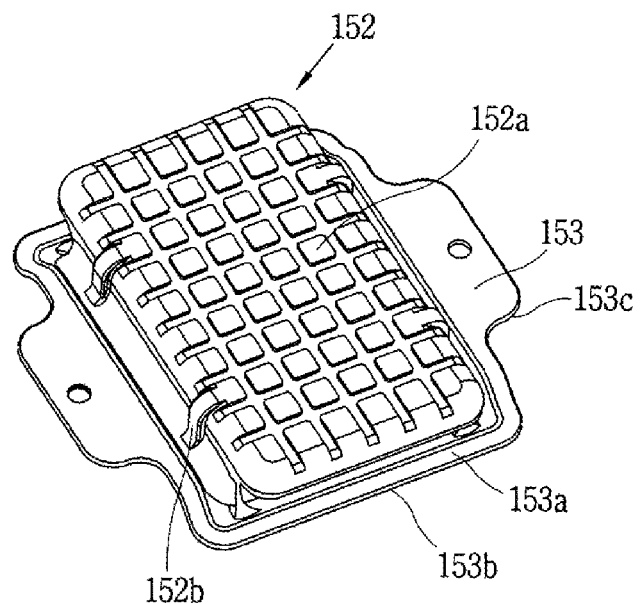
FIG. 17(a) is a perspective view of a second connector upper body and FIG. 17(b) is a perspective view of the second connector lower body.
Figure 17B:
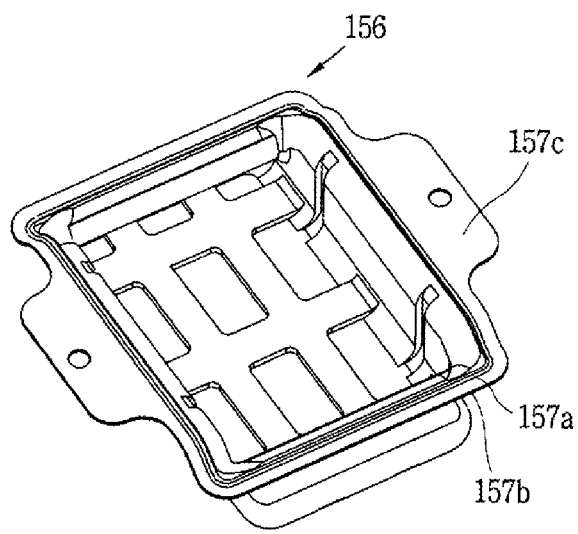

The upper body 111 and the lower body 121 are coupled as the upper wing part 111a and the lower wing part 122 come into contact with each other (please see FIG. 13). Here, the upper wing part 111a and the lower wing part 122 are coupled to form main wing parts 111a and 122. A space is formed between the upper crease 119 of the upper wing part 111a and the lower crease 129 of the lower wing part 122, and silicon is applied to the space to attach the upper body 111 and the lower body 121. An end portion of the upper wing part 111a is bent to have a "ㄱ" shape, and the lower wing part 122 has a straight shape, so the upper wing part 111a is inserted into the lower wing part 122 such that it enclose the lower wing part 122. Thereafter, rivets 130 are coupled along the creases 119 and 129 at predetermined intervals. In order to ensure stable coupling, edge portions of the upper wing part 111a and the lower wing part 122 may be welded.

Meanwhile, when the upper body 111 and the lower body 121 are coupled, the inner spaces S1 and S2 may be filled with a buoyant material such as polystyrene (Styrofoam), or the like. Thus, even when the buoyant member 110 is individually installed, it may receive buoyancy to well float on the water.

A plurality of screw holes 116 may be formed in the main wing parts 111a and 112 of the buoyant member 110 for coupling with the connector 140.

The connector 140 includes a first connector 141 formed to be long, and a second connector 151 formed to be short. The first connector 141 and the second connector 151 are alternately connected.

The first connector 141 is composed of a first upper body 142 and a first lower body 146. The first upper body 142 has a box shape with an open lower portion, and a first upper wing part 143 is formed in a lower portion thereof such that it is protruded laterally. Like the upper crease 119 of the upper wing part 111a, the first upper wing part 143 has first upper creases 143a formed in two rows along the edges thereof inwardly.

A plurality of slip preventing protrusions 142a are arranged to cross each other vertically and horizontally on an upper surface of the first upper body 142, and a plurality of ribs 142b are formed on a lateral surface of the first upper body 142 in order to reinforce rigidity. Also, an air hole 144 is formed in one lateral surface of the first upper body 142 and a uni-directional valve 145 may be provided in the air hole 144.

The first lower body 146 is formed to have a box shape with an open upper portion, and a first lower wing part 147 is formed in an upper portion thereof such that it is protruded laterally. Like the lower crease 129 of the lower wing part 122, the first lower wing part 147 has first lower creases 147a formed in two rows along the edges thereof inwardly.

A plurality of slip preventing recess 146a are arranged to cross each other vertically and horizontally on a lower surface of the first lower body 146, and a plurality of ribs 146b are formed on a lateral surface of the first lower body 146 to reinforce rigidity.

As the first upper wing part 143 and the first lower wing part 147 come into contact to be combined to form first connection wing parts 143 and 147.

In order to couple the first upper body 142 and the first lower body 146, silicon is applied to a space between the first upper crease 143a and the first lower crease 147a, the first upper wing part 143 and the first lower wing part 147 are attached, and rivets are subsequently combined at predetermined intervals along the first upper creases 143a and the first lower creases 147a, like the way in which the upper body 111 and the lower body 121 are coupled.

An inner space of the first connector 141 may be filled with a buoyant material such as polystyrene (Styrofoam).

The second connector 151 is composed of a second upper body 152 and a second lower body 156. The second upper body 152 has a box shape with an open lower portion, and a second upper wing part 153 is formed in a lower portion thereof such that it is protruded laterally. The second upper wing part 153 has second upper creases 153a formed in two rows along the edges thereof inwardly. Also, in the second upper wing part 153, a step is formed such that a width directional portion 153b thereof is lower than a length directional portion 153 thereof.

A plurality of slip preventing protrusions 152a are arranged to cross each other vertically and horizontally on an upper surface of the second upper body 152, and a plurality of ribs 152b are formed on a lateral surface of the second upper body 152 in order to reinforce rigidity. Also, an air hole 154 is formed in one lateral surface of the first upper body 152 and a uni-directional valve 155 may be provided therein.

A recess depressed inwardly is formed in a width directional lateral portion 152d among lateral surfaces of the second upper body 152.

The second lower body 156 is formed to have a box shape with an open upper portion, and a second lower wing part 157 is formed in an upper portion thereof such that it is protruded laterally. The second lower wing part 157 has second lower creases 157a formed in two rows along the edges thereof inwardly. Also, in the second lower wing part 157, a step is formed such that a width directional portion 157b thereof is lower than a length directional portion 157c thereof.

A plurality of slip preventing recesses 156a are arranged to cross each other vertically and horizontally on a lower surface of the second lower body 156, and a plurality of ribs 156b are formed on a lateral surface of the second lower body 156 in order to reinforce rigidity.

A recess depressed inwardly is formed in a width directional lateral portion 156d among lateral surfaces of the second lower body 156.

The second upper wing part 153 and the second lower wing part 157 come into contact to be coupled to form second connection wing parts 153 and 157.

The way in which the second upper body 152 and the second lower body 156 are coupled to form the second connector 151 is the same as that of the first connector 141, so a description thereof will be omitted.

The first connector 141 and the second connector 151 may be alternately connected to form a single structure. A length of the structure may be adjusted according to a size or the number of solar panels 30 to be supported. When the first connector 141 and the second connector 151 are connected, the first connection wing parts 143 and 147 of the first connector 141 and the second connection wing parts 153 and 157 of the second connector 151 are stepped without being in contact, so they are not interfered (please see FIG. 10).

The buoyant member 110 and the connector 140 are coupled by coupling the first connection wing parts 143 and 147 of the first connector 141 and the second connection wing parts 153 and 157 to the main wing parts 111a and 122 of the buoyant member 110. The first connection wing parts 143 and 147 of the first connector 141 and the second connection wing parts 153 and 157 of the second connector 151 are mounted on the main wing parts 111a and 122 of the buoyant member 110 and screw-coupled to the screw holes 116 and 159 and 116 and 159, respectively.

In an application embodiment of the foregoing embodiment, when earth and sand, stone, steel, or the like, is inserted into the inner spaces S1 and S2 of the buoyant member 110, the buoyant member 110 may serve as a holder on which the solar panel 30 is held.

Figure 18:
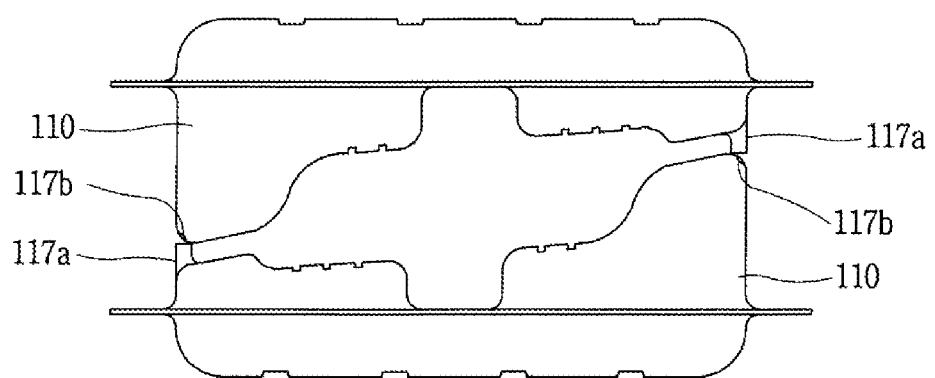
FIG. 18 is a side view of a loaded state of a buoyant member.

Meanwhile, FIG. 18 illustrates a state in which the buoyant members 110 are stacked. The buoyant members 110 are piled up such that they face in a rotation symmetrical state. In this case, the buoyant members 110 may be easily stacked by partially inserting loading protrusions 117a of the upper buoyant member 110 to loading recesses 117b of the lower buoyant member 110.

The foregoing embodiments and advantages are merely exemplary and are not to be considered as limiting the present disclosure. The present teachings can be readily applied to other types of apparatuses. This description is intended to be illustrative, and not to limit the scope of the claims. Many alternatives, modifications, and variations will be apparent to those skilled in the art. The features, structures, methods, and other characteristics of the exemplary embodiments described herein may be combined in various ways to obtain additional and/or alternative exemplary embodiments.

As the present features may be embodied in several forms without departing from the characteristics thereof, it should also be understood that the above-described embodiments are not limited by any of the details of the foregoing description, unless otherwise specified, but rather should be considered broadly within its scope as defined in the appended claims, and therefore all changes and modifications that fall within the metes and bounds of the claims, or equivalents of such metes and bounds are therefore intended to be embraced by the appended claims.

What is claimed is:

1. A supporting device for a solar panel, the supporting device comprising:
   a plurality of buoyant members, each comprising:
      an upper body having an upper wing part formed in a lateral surface and comprising a plurality of upward protrusions and a first prop and second prop each formed on one of the plurality of protrusions to support the solar panel; and
   a lower body on which lower wing part is formed, the lower wing part protruding from a side of the lower body and lower surface of the lower body protruding downward,
   wherein the upper wing part and lower wing part are coupled to form a main wing part; and
   a connector formed to have a box shape and connecting the plurality of buoyant members in a vertical or horizontal direction, a plurality of connection wing parts formed in lateral surfaces of the connector, and
   wherein each of the plurality of buoyant members is coupled to the connector by coupling the plurality of connection wing parts to the corresponding main wing part.

2. The supporting device of claim 1, wherein a receiving part is formed in each second prop to facilitate installation of the solar panel.

3. The supporting device of claim 2, wherein:
   coupling recesses are formed on one side of each of the corresponding first and second props; and
   the solar panel is fixedly coupled by clamps and bolts inserted into the coupling recesses.

4. The supporting device of claim 1, wherein:
an air hole is formed in a portion of each first prop; and
a uni-directional valve is provided in the air hole.

5. The supporting device of claim 1, wherein each lower surface has a streamlined shape.

6. The supporting device of claim 1, wherein:
a first groove is formed on a lateral circumference of the connector; and
each of the plurality of connection the wing parts is inserted into the first groove.

7. The supporting device of claim 6, further comprising:
a second connector.

8. The supporting device of claim 7, wherein:
a second groove is formed in a lateral surface of the second connector in a length direction to communicate with the first groove; and
a wing part is formed in a lateral surface of the second groove in a width direction and coupled to the first groove in the width direction.

9. The supporting device of claim 1, further comprising:
a support pipe coupled to each corresponding upper and lower wing part in order to fixedly connect two or more of the plurality of buoyant members.

10. The supporting device of claim 1, wherein
a clamp mounting part is formed in each first and second prop to receive a clamp to support the solar panel.

11. The supporting device of claim 1, wherein:
an upper ventilation hole is formed in a central portion of each upper body;
an upwardly protruding support portion is formed in a central portion of each lower body; and
a lower ventilation hole is formed in each support portion to communicate with the corresponding upper ventilation hole.

12. The supporting device of claim 1, wherein:
a plurality of upper creases are formed on edges of each upper wing part;
a plurality of lower creases corresponding to the plurality of upper creases are formed on edges of each lower wing part; and
a gap is formed between corresponding upper and lower creases when the corresponding upper and lower wing parts are coupled.

13. The supporting device of claim 1, wherein an end portion of each upper wing part bent in a "ㄱ" shape along its edges.

14. The supporting device of claim 1, wherein:
a plurality of slip preventing protrusions are arranged vertically and horizontally on an upper surface of each of the plurality buoyant members and the connector; and
a plurality of slip preventing recesses are arranged vertically and horizontally on a lower surface of each of the plurality buoyant members.

15. The supporting device of claim 1, wherein the connector comprises a first connector and a second connector shorter than the first connector.

16. The supporting device of claim 15, wherein:
a plurality of connection wing parts are formed in the second connector; and
a step is formed in each of the plurality of connection wing parts such that a width portion of each of the plurality of connection wing parts is lower than a corresponding length portion.

17. The supporting device of claim 15, wherein a groove is formed in a lateral surface of the second connector in a width direction.

18. The supporting device of claim 1, wherein inner spaces of each of the plurality of buoyant members and the connector are filled with Styrofoam™, stone, steel, or earth and sand.

19. The supporting device of claim 1, wherein:
a loading recess is formed in each first prop; and
a loading protrusion is formed in each second prop.

* * * * *